United States Patent
Shaffer et al.

(10) Patent No.: US 8,160,614 B2
(45) Date of Patent: Apr. 17, 2012

(54) AUTOMATED CONCIERGE SYSTEM AND METHOD

(75) Inventors: James D. Shaffer, Rancho Santa Fe, CA (US); John F. Keaveney, San Diego, CA (US)

(73) Assignee: Targus Information Corporation, Vienna, VA (US)

( * ) Notice: Subject to any disclaimer, the term of this patent is extended or adjusted under 35 U.S.C. 154(b) by 743 days.

(21) Appl. No.: 11/462,167

(22) Filed: Aug. 3, 2006

(65) Prior Publication Data

US 2007/0032247 A1 Feb. 8, 2007

Related U.S. Application Data

(60) Provisional application No. 60/705,554, filed on Aug. 5, 2005.

(51) Int. Cl.
*H04W 24/00* (2009.01)
(52) U.S. Cl. ............... 455/456.3; 455/456.2; 455/456.1; 455/457; 455/456.6
(58) Field of Classification Search .... 455/456.1–456.3, 455/456.6, 457, 550.1; 370/328–338; 701/207; 705/346, 14.57, 14.58
See application file for complete search history.

(56) References Cited

U.S. PATENT DOCUMENTS

| | | | |
|---|---|---|---|
| 6,336,072 B1 | 1/2002 | Takayama et al. | |
| 6,546,337 B2 | 4/2003 | Fish et al. | |
| 2004/0023644 A1* | 2/2004 | Montemer | 455/414.1 |
| 2004/0023666 A1* | 2/2004 | Moon et al. | 455/456.1 |
| 2005/0020309 A1* | 1/2005 | Moeglein et al. | 455/561 |
| 2006/0172746 A1* | 8/2006 | Kaplan | 455/456.3 |
| 2007/0015521 A1* | 1/2007 | Casey | 455/456.3 |
| 2007/0140439 A1* | 6/2007 | Olrik et al. | 379/67.1 |

FOREIGN PATENT DOCUMENTS

| | | |
|---|---|---|
| WO | WO 00/03364 | 1/2000 |
| WO | WO 01/90769 | 11/2001 |
| WO | WO 2004/060003 | 7/2004 |

* cited by examiner

*Primary Examiner* — Kamran Afshar
*Assistant Examiner* — Kathy Wang-Hurst
(74) *Attorney, Agent, or Firm* — Procopio, Cory, Hargreaves & Savitch LLP

(57) ABSTRACT

A method and system for providing automated concierge services to end users communicates with users over network devices, such as telephones and wireless devices, and utilizes third party network location-based service (LBS) applications, such as Internet/Web locators, to obtain location information based on user requests. On receipt of a request from a mobile device, the location of the mobile device is identified. A network application related to the requested service is identified and the user location is translated into an input parameter compatible with the network application which is provided to the network applications. A response to the input parameter is received and processed in order to generate an answer to the user's request. Finally, the application sends the answer to the user.

69 Claims, 5 Drawing Sheets

AUTOMATED CONCIERGE SYSTEM AND METHOD

RELATED APPLICATION

The present application claims the benefit of U.S. provisional patent application 60/705,554, entitled AUTOMATED CONCIERGE METHOD, filed on Aug. 5, 2005, which is incorporated herein by reference.

BACKGROUND

1. Field of the Invention

This invention relates to an automated system and method for providing location-based concierge services to end users communicating over network devices, such as telephones and wireless devices, and utilizing third party network location-based service applications, such as Internet/Web locators.

2. Related Art

The term concierge has evolved from its originally somewhat specific meanings such as a hotel staff member who handles luggage, reservations and tours, etc., to refer more generally to the provision of personalized services. Many concierge services are location-based, such as identifying nearby restaurants or attractions, or providing local maps or directions.

The Internet and World Wide Web ("Web") have helped spur the evolution in concierge services by providing mechanisms to facilitate and automate a variety of services. The Internet and Web have also helped to spur innovation in location-based services (LBS) such as store locators, including the ability to generate maps and turn-by-turn directions. This in turn prompted the development of third party network LBS applications such as Internet/Web locators for users communicating over network devices such as telephones and wireless devices.

Relatively recent "911" legislation requires wireless carriers in the United States to be able to determine the current location of a wireless device. This typically is done via a Global Positioning System ("GPS") chip and receiver in the wireless device and/or via network triangulation. These methods can provide a fairly precise latitude and longitude estimate of the wireless device's current location. There can be privacy concerns related to providing the telephone number and the precise coordinate location of a mobile phone to an entity outside the mobile phone network for uses other than emergency 911 services.

Multi-location businesses such as, for example, Pizza Hut®, Domino's® Pizza, Starbucks®, Automated Teller Machines ("ATM"s), Federal Express ("FedEx"), and United Parcel Service, Inc. ("UPS"), commonly provide locator systems for identifying nearby locations via company websites. Also online Yellow Pages® from major telephone companies and many independent Yellow Pages® publishers are available from a variety of websites that generally accept location identifiers such as a ZIP code or other postal code, street address and/or street intersection as a proxy for the user's current location or starting point of interest. In some cases, such as Federal Express, a user can provide a 10-digit telephone phone number as the location identifier, which the website will associate with a physical location.

SUMMARY

Aspects of embodiments disclosed herein relate to issues involving use of third party network location-based services ("LBS") applications, such as Internet/Web locators, for use in providing concierge services to end users communicating over network communication devices, such as wire-line telephones and wireless devices such as cell phones, personal digital assistants (PDAs), laptop computers and the like.

In one embodiment, an automated concierge method comprises receiving a location-based service request from a user of a communication device, which may be a mobile or wireless device or a wire-line device, such as a request to find the nearest location of a particular merchant or type of merchant. The request can come in a variety of ways, such as through a spoken request, a Graphical User Interface ("GUI") or other command input at a mobile or wireless device, or a text message. A network application such as a website related to the service request is identified, for example, a store locator application on the Web. An input to the network application is provided based on the coordinate location of the communication device, such as a street address, a ZIP+4 code, a USPS Delivery Point Code (DPC) or ZIP+6 code, or other postal code nearest to the location of a cell phone. An output is received from the network application, such as the identification of the nearest location for a requested merchant and/or attributes related to a particular location relevant to the mobile device (e.g., directions, store hours, and the like) and a location-based service is provided to the mobile device based on the output, such as displaying or speaking back information about a nearby location, or directions to such a location.

According to other embodiments, methods of providing automated concierge services include obtaining multiple coordinate locations of a mobile device over time. The coordinate location can be obtained from the mobile device or from a system external to the mobile device that determines the mobile device location, such as a cell phone network infrastructure. In some embodiments a measure of the precision of the coordinate location of the mobile device is obtained and used in determining the type of information provided to the user in response to the service request.

The method of providing automated concierge services may include the option of receiving a spoken information request or a request derived from spoken information. The request can also come from a text message or key entered data, or from input obtained through a graphical user interface. Similarly the output from the concierge service can be a spoken output, e.g., text-to-speech or recorded voice, a text message output, or a graphical user interface output.

Methods of providing automated concierge services according to other embodiments include accessing network applications, such as web applications available at company or other websites. In some cases the websites can be company specific sites selected from multiple candidate sites, and in some cases they can be sites that provide information for multiple independent companies.

According to other embodiments, methods of providing automated concierge services include prompting a mobile device user to select an entity associated with a network application from multiple candidate entities.

In some embodiments, an automated concierge service method or system may access one or more websites that provide information about multiple merchants or companies that provide a similar product or service or brand such as, for example, pizza restaurants or shoe repair shops or sports-related brands. In some embodiments the concierge method accesses one ore more websites that provide information about multiple locations that provide the same brand, such as Reebok®. The method may include determining a street address, ZIP code, ZIP+4 code, DPC or ZIP+6 code, other type of postal code, or city and state based on the coordinate location of the mobile device for use as an input parameter to a website.

Multiple network applications may be queried with different inputs in a representative embodiment, such as querying a web store locator with a postal code and querying a different website to obtain related directions based on a street address. Providing a location-based service to a mobile device can comprise providing information about multiple locations near to the mobile device, including directions to one or more nearby locations.

In one embodiment, a communication session is established between a wireless device and a particular location identified by a network application, such as a voice link to a particular store or merchant identified by website store locator. The concierge service can enable an order for a product or service from a particular location to be placed by the user of the communication device.

An automated LBS method according to one embodiment includes obtaining a latitude and longitude pair of the current location of a mobile device, receiving a request for location-based information from a user of the mobile device, identifying a company-specific location-based web application related to the service request, translating the latitude and longitude pair to a location identifier for use as an input parameter to the web application, providing the location identifier to the web application, receiving an output from the web application, and providing information to the mobile device user based on the output.

In some embodiments, automated LBS methods may include receiving an input parameter representing a location associated with a user communicating over a network, receiving a location-based service request initiated by the user selecting a web LBS application from multiple candidate web LBS applications based on the service request, providing the input parameter to the selected web LBS application, receiving an output from the web LBS application, and providing selected information from the output over the network for use in providing a location-based service to the user. Different embodiments implement these methods either with or without interaction with a live operator.

The foregoing description of aspects of embodiments is not intended to limit the inventions to particular combinations or examples more limited than the combinations specifically claimed. The following detailed description of representative embodiments will illustrate these and other aspects of embodiments of the inventions. The inventions are susceptible to various modifications and alternatives.

Other features and advantages will become more readily apparent to those of ordinary skill in the art after reviewing the following detailed description and accompanying drawings.

BRIEF DESCRIPTION OF THE DRAWINGS

The details of the inventive systems and methods, both as to their structure and operation, may be gleaned in part from the following description of some representative embodiments taken in conjunction with the accompanying drawings, in which like reference numerals refer to like parts, and in which.

DETAILED DESCRIPTION

Certain embodiments as disclosed herein provide a system and method for location-based concierge services, which utilizes network location-based services (LBS) applications, such as Internet/Web locators, available at various websites to provide information to end users communicating over network devices such as telephones and wireless devices. For example, one method as disclosed herein allows for providing an automated concierge service, comprising receiving a location-based service request from a mobile device, such as a request to find the nearest location of a particular merchant, or to locate the closest store or business of a particular type, querying and obtaining a coordinate location of the mobile device, such as a latitude and longitude of a cell phone or personal digital assistant ("PDA"), creating a query in the appropriate format for an Internet/Web locator based upon the request to obtain information, and providing the obtained information to the mobile device in a format appropriate for that device.

After reading this description it will become apparent to one skilled in the art how to implement the inventive aspects in various alternative embodiments and alternative applications. However, although various embodiments will be described herein, it is understood that these embodiments are presented by way of example only, and not limitation. As such, this detailed description of various alternative embodiments should not be construed to limit the scope or breadth of the claims.

Figure 1:
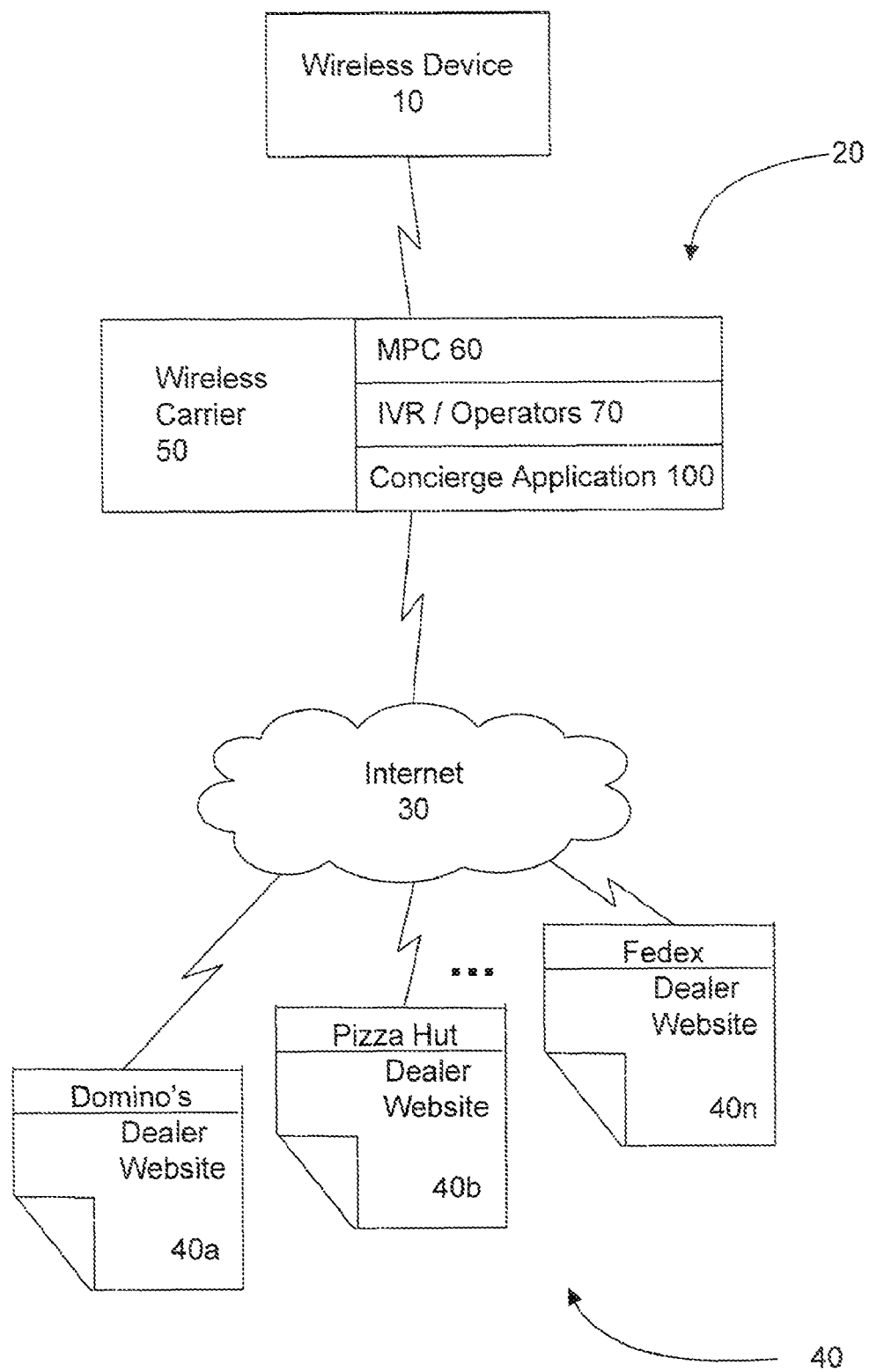
FIG. 1 is a block diagram illustrating a wireless device connected to a wireless carrier incorporating a concierge application according to an exemplary embodiment.

FIG. 1 is a block diagram illustrating a simplified example of a wireless device connected to a wireless carrier incorporating a concierge system according to one embodiment. In the illustrated embodiment, an end user wireless device 10 is connected to a wireless infrastructure 20, which in turn can communicate via the Internet 30 with websites identified as 40a, 40b through 40n, and generally referred to as 40. The websites contain location based service ("LBS") or network applications for locating various types of merchants or services. The wireless infrastructure 20 comprises a wireless carrier 50, Mobile Positioning Center ("MPC") 60, one or more Interactive Voice Response ("IVR")/operator platforms 70, and a wireless concierge application or module 100. The wireless carrier 50 represents those aspects of a wireless network, such as a cellular telephone network, that are not explicitly depicted in the figure. While FIG. 1 illustrates the concierge application 100 and IVR/operators 70 as part of infrastructure 20, these modules may also be located outside infrastructure 20, for example on one or more servers connected to the wireless infrastructure 20 through the Internet 30 or separate network connections.

As described below in more detail, the concierge application 100 facilitates access to a variety of different types of websites having location based service ("LBS") applications from the wireless device 10 without requiring the wireless device user to comply with the different locational input and query formats as required by the different websites or LBS applications 40. In one embodiment, the concierge application 100 is implemented as software running on a server on or in communication with the wireless carrier 50 network. As also discussed below in more detail, in other embodiments the concierge application 100 can be used in other network environments, for example when substituting a wire-line device such as a conventional telephone for the wireless device, in which case a different carrier such as a wire-line or VoIP telephony carrier may be substituted for the wireless carrier 50.

Wireless device 10 may be a cell phone, personal digital assistant ("PDA"), laptop computer, or the like. There are a variety of types of end user wireless devices 10 and infrastructures 20, with prevalent examples today being personal communication services ("PCS"), global system for mobile communications ("GSM") and code division multiple access ("CDMA") cell phones and networks. As it pertains to the embodiments discussed above and below, the particular protocols of the end user device and carrier are immaterial so long as it is possible to obtain or determine the location of the wireless device 10, to exchange voice and/or data to and from the end user wireless device 10, and to interface with the concierge application 100, which in turn can interface with the web LBS applications 40.

To provide for LBS functionality and to enable compliance with the emergency "911" requirements for mobile phones, the illustrated wireless infrastructure 20 includes the MPC 60, which is configured to obtain and store the location of wireless devices 10. Device locations can be obtained in a variety of ways depending on the particular wireless carrier 50 and/or the wireless device 10. In the case of a GPS-enabled device, the MPC 60 can receive a location reported directly from the wireless device 10. In other cases the infrastructure 20 can use network triangulation techniques to determine the location of the wireless device 10, although this can be less precise than when the device itself has a GPS receiver. There are other variations such as differential GPS and assisted GPS. However, the details as to the particular form of GPS technology are generally irrelevant because the key point is that it is possible to obtain an indication of the location of the wireless device 10 in some format, such as latitude and longitude coordinates of the location, for example.

The wireless infrastructure 20 provides access via the Internet 30 to websites having LBS applications 40, which today are available from a number of companies or merchants. Exemplary website LBS applications include store locators for many merchants, for example Domino's®, Pizza Hut®, other pizza delivery companies, restaurants of various types, a drop box locator for FedEx®, a Starbucks® website that provides a variety of Starbucks-related LBS applications, store websites, a generic Yellow Pages® website that provides LBS applications based on compiled Yellow Pages® business data, and a VISA® ATM locator website, among others.

While the illustrated embodiments show web applications or websites 40 accessed over the Internet 30, the web applications or associated merchant information may be accessed over other types of networks and connections in alternative embodiments. Additionally, although the drawings illustrate user concierge requests received from a wireless device, such requests may alternatively be received from a wire-line telephone using a phone number which connects to the concierge application.

In one embodiment, the wireless infrastructure 20 of FIG. 1 includes the concierge application 100 which provides the wireless device 10 with access to the LBS applications at websites 40. In another embodiment, the concierge application 100 can be implemented in software running on a computer such as a network server or the like separate from wireless infrastructure 20. In another embodiment, the concierge application 100 can be implemented in a first software application running on the wireless device 10 and capable of communicating with another software application running on a network server or a server incorporated into the wireless infrastructure 20.

Figure 2:
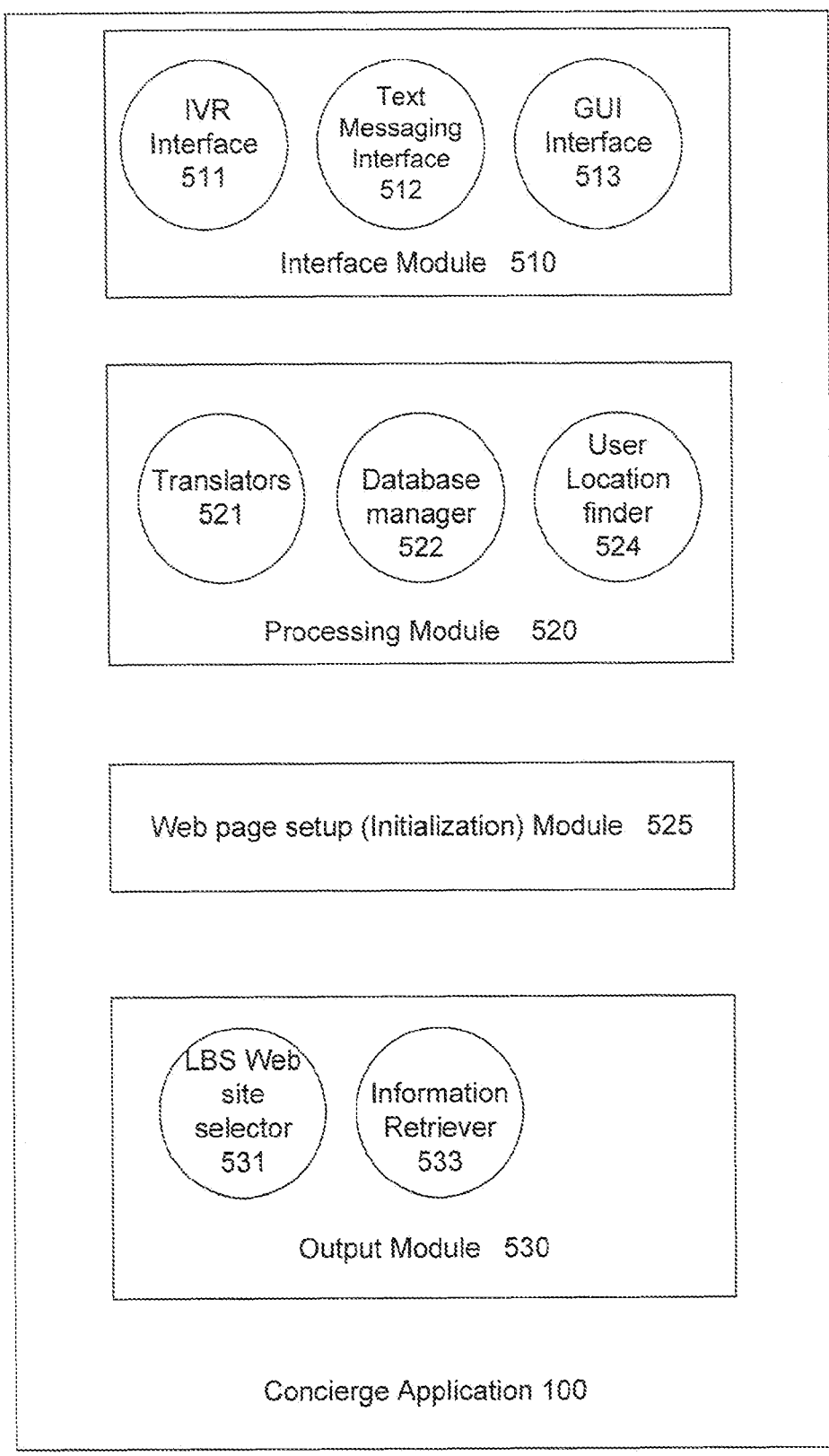
FIG. 2 is a functional block diagram of the concierge application of FIG. 1.

FIG. 2 is a functional block diagram of one embodiment of a concierge application 100. In the illustrated embodiment, the concierge application comprises an interface module 510, a processing module 520, a website set up or initialization module 525, and an output module 530. The interface module may comprise an IVR interface 511 for voice communications with a user, a text messaging interface 512 for communications using text messages, which is a popular form of communication for cell phones and PDAs, and a graphical user interface (GUI) or other command interface 513 for communications over a GUI or the like. A GUI is commonly used by personal digital assistants ("PDA"s) and other devices like cell phones with bit-mapped displays. It will be understood that other types of user interface may be provided in interface module 510.

The processing module 520 is responsible for analyzing user requests, generating auxiliary questions in response to user requests, identifying websites for use in responding to user requests, generating queries for websites for obtaining information, and preparing answers to user requests based on information received from websites. Processing module 520 comprises translators 521, database manager 522, and user location finder 524.

Translators 521 are configured to translate user communications into a format understood by the concierge application and to translate information retrieved by the concierge application from LBS websites into the format being utilized by a user's device. In other words, information or queries provided from the user are translated into a format compatible with the format which the concierge application uses to store information.

The data base manager 522 is linked to web page setup (initialization) module 525, and manages and maintains a list of concierge service categories with links to websites which may provide information appropriate for each of the service categories, as well as the contents of user input tables or scripts and concierge output tables or scripts. The database manager 522 maintains user request information stored in input tables, verifies whether the concierge has sufficient information to answer the user's question, selects additional questions for the user, updates concierge output tables with information obtained from one or more selected LBS websites, and manages the output tables containing the information obtained from the LBS websites.

The list of service categories and associated websites, along with the user input tables and concierge output tables, are initially set up by web page set up module 525, which is described in more detail below in connection with FIG. 4. The service categories are linked to the Uniform Resource Locators (URLs) of identified LBS websites in the database manager. The list of categories and associated websites may, for example, link a particular merchant with the URL for that merchant's website, or may link a general type of merchant request with the URL or URLs of several merchants of that type, or to a more general search engine for locating different types of merchant. For example, a pizza restaurant service category may be linked to URLs of various different pizza restaurants. The initialization process also involves setting up scripts or tables of appropriate user inputs and concierge outputs linked to each service category and website, as will be described in more detail below in connection with FIG. 4. The identified list of service categories and associated URLs, and the associated scripts or tables, are all stored by the data base manager 522.

The user location finder module 524 is configured to find the location of a wireless device from which a user request originated. Device location may be found in various different ways in different embodiments. In one embodiment, the location finder module may query an MPC 60 to find the location of the user device. Device location may alternatively be obtained directly from the user's wireless device, if equipped with a Global Positioning System (GPS) sensor. Network triangulation techniques may be used to find the location when the communication device is not a GPS device. Various other location techniques may alternatively be used.

The output module 530 of the concierge application comprises an LBS website selector 531 and an information retriever 533. The website selector 531 analyzes user request information contained in an input table or script, reviews the concierge's list of websites providing LBS services, and selects a website that can provide the information requested by the user. The information retriever 533 retrieves the information from the selected LBS website and stores it in output tables. Because collecting information requested by the user may require multiple accesses to the LBS website and/or access to multiple LBS websites, the concierge application may have to invoke the LBS website selector 531 and the information retriever 533 more than once.

Figure 3:
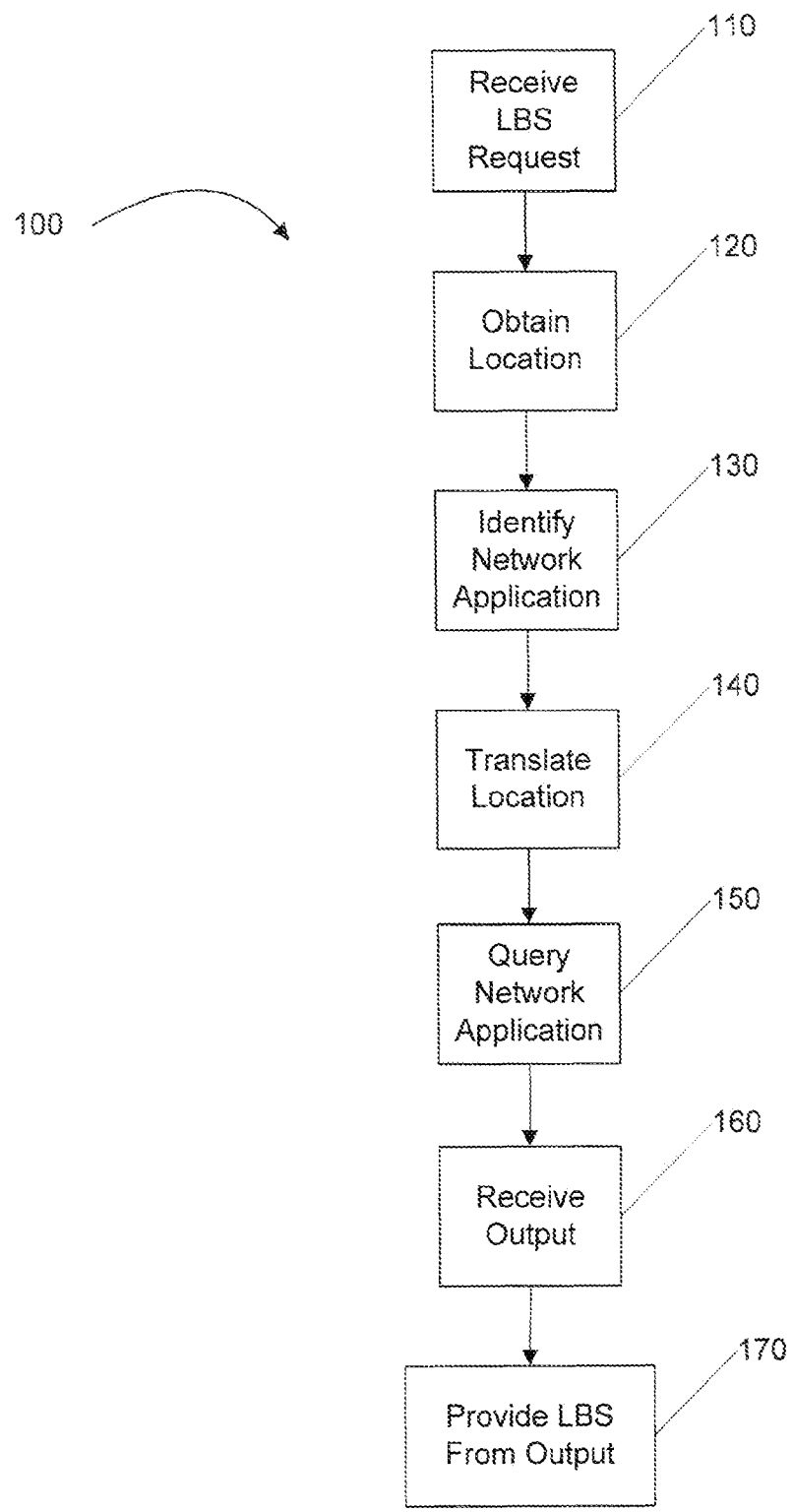
FIG. 3 is a flowchart showing steps and processes of the concierge application.

FIG. 3 is a flowchart showing steps of an automated concierge method according to an embodiment, using the concierge application or system 100 of FIGS. 1 and 2. The steps can be performed in orders different than the one shown.

In the illustrated embodiment, at a step 110, the concierge application receives a request for a location based service from a user of a communication device 10. This request may be any location based service request, such as "find a Vietnamese restaurant", or "find Starbucks®", for example. The request is received via interface module 510.

The user may communicate the LBS request to the concierge application by text messaging from a mobile phone or PDA, and communications will then proceed via the text messaging interface 512. To facilitate that type of communication, the text messaging interface 512 of the concierge application 100 establishes communication with the user and collects the messaging data stream. Alternatively, the user may access the concierge application using a graphical user interface (GUI) displayed on the wireless device, and communications then proceed via GUI interface 513. Such a graphical user interface on a communication device such as a cell phone or PDA may be provided with a menu for accessing the concierge application 100 and for clicking on certain frequently used types of requests, such as "Find the nearest Starbucks®" for example, as well as allowing the user to input specific or custom location based service requests. If the user contacts the concierge application 100 by launching a browser and contacting the URL for the concierge application, communications can proceed by displaying responses and receiving user input on the browser.

In another embodiment, the user may contact the concierge application by dialing a dedicated telephone number (such as a 1-800 or 1-877 number or the like) provided for the concierge application and serviced by the wireless infrastructure 20. In the illustrated embodiment, device 10 is a mobile communication device or wireless device. However, it should be understood that the user may also request concierge service using a wire-line telephone via a POTS (Plain Old Telephone Service) network. If the user interacts with the concierge application via voice connection, the IVR interface 511 collects the voice input information from the user, plays additional questions to narrow down the search for the answer to the user's question, and accepts voice answers to such questions. If the user contacts the concierge application 100 via the telephone in step 110, the concierge application 100 collects the information from the user using, for example, an IVR system. IVR technology can allow the cell or wire-line phone user to use speech input and output to access the LBS website applications provided via the Internet. Thus, for example, a cell phone user may say "find the nearest Starbucks®" and the concierge application 100, using a method such as those disclosed below, interacts with an IVR platform 70 to enable the wireless infrastructure to speak back the location and directions to the nearest Starbucks®. The information collected by the IVR system is translated by the translators 521 to the format understood by the concierge application 100. Then, the translators 521 parse the information into elements that can be stored in the user input tables (or arrays) described below in connection with FIG. 4.

In some embodiments, methods of providing concierge services include a live operator, who can interact with the caller on request to obtain the necessary information which the concierge application 100 then communicates to the network applications (e.g., LBS websites). A caller may request transfer to a live operator, or there is an automatic transfer to the live operator when there is a problem with the automated service, for example it is unable to obtain sufficiently precise instructions from the user in order to narrow down the search. When the query is made to a live operator, the operator obtains location information either automatically obtained from the network (e.g., lat/long, or a translated location such as an address, ZIP+4 code or a U.S. Postal Service Delivery Point Code ("DPC") or ZIP+6 code which is equivalent to an address) or provided by the caller (e.g., a spoken address or intersection or city and state, or address information such as a ZIP+4 or ZIP+6 code entered via a keypad or GUI).

Additional questions may be necessary after the first request is made, regardless of the format in which the request is received and whether an automated service or a live operator is used. The additional questions may be needed in order to narrow down the search for an appropriate website to provide the information required by the user. These questions may be displayed on the screen of the wireless or other communication device when the original question is received via text messaging interface 512 or GUI interface 513, or may be provided as voice output via the IVR interface when the query was received via voice communication from the user device 10.

After receiving the user request, the concierge application obtains the end user location of the communication device 10 from which the request originated (step 120). The end user location may be latitude and longitude coordinates, a street address obtained from such coordinates, an intersection, a postal code such as a zone improvement plan ("ZIP") code or more precise ZIP+4 or ZIP+6 (DPC) code as used by the United States Postal Service ("USPS"), or the like. Although the following description refers to ZIP, ZIP+4 and ZIP+6 or DPC codes of the USPS, it will be understood that the system may alternatively produce location information based on other types of postal codes as used in other countries, and may convert coordinate locations of users in such countries to the respective country postal code. The initial location format may be converted to a different format depending on the requirements of the LBS website or sites being accessed to obtain the required information, as discussed in more detail below in connection with step 140.

The location of the communication device 10 may be obtained in various different ways depending on the network used by device 10. Where device 10 is a mobile device, the user location finder may contact a mobile positioning center of the network currently used by the device, such as MPC 60 as described above in connection with FIG. 1, or another device location provider, or may determine the location directly using various location finding techniques. An MPC 60 obtains and stores the locations of mobile subscribers for emergency 911 type services. Concierge application 100 can query the MPC about the location of the mobile or wireless device 10 which is requesting a location based service, and then receive and store the current latitude and longitude location coordinates of device 10. Alternatively, coordinate location may be obtained directly from the user device 10 if the device has a built-in GPS receiver. Device locations can be obtained in a variety of ways depending on the particular wireless carrier 50 and/or the wireless device 10. In a heterogeneous network environment with multiple network providers, the network device or wireless device location may be obtained, for example, using the method described in U.S. Patent Application Publication No. 20060106930 (co-pending application Ser. No. 11/281,952 filed Nov. 15, 2005), the contents of which are incorporated herein by reference. In this method, the type of network used by the mobile or other communication device is first identified, and location information is then obtained from a selected device location provider based on the network identification.

If the user request was received via a wire-line telephone, the location finder module 524 can obtain the precise location (address of the phone's location) or a general location (e.g. the address of a switch to which the phone is connected) from the telephone company or databases of wire-line location information. If the address information cannot be found directly using any of these techniques, the system may contact the user and ask for location information, using the appropriate communication format based on the manner in which the user first contacted the system (e.g. voice call, text messaging, using a GUI interface, or the like). In some cases, a coordinate location may not be available. In this case, the wireless infrastructure 20 may determine a general location of the mobile device which is sufficient to identify the city and state.

In one embodiment, the location finding step may also involve obtaining a series of coordinate locations of the mobile device 10, for example when the device is in a moving vehicle. The direction of travel of the mobile device may be obtained from multiple samples of the current location over time. This will enable the concierge application to provide directions or select a location based on the direction or travel path. Alternatively, multiple samples can be averaged or otherwise manipulated to provide an improved estimate of the user location.

At a step 130, the LBS website selector 531 of the concierge application 100 identifies at least one website 40 that corresponds to the request from step 110. This may be done by accessing the previously stored list or directory of websites and associated categories in the database manager module 522. If no appropriate previously stored category is found in the list, more specific information may be requested from the user, or one of many Web browsers or crawlers (e.g. Google®, Netscape®, Yahoo®, etc) may be used to narrow down the search. For example, to find a type of location that is not company specific, such as a Vietnamese restaurant, the concierge application 100 uses websites that provide access to compiled Yellow Pages® and/or business information for the city where the end user is located. In the case of a restaurant, the concierge application 100 may also use a specialty website such as www.restaurants.com. For a company specific request, such as finding the location of or directions to the nearest Starbucks®, the concierge application 100 uses the Starbucks® website. The concierge application 100 may identify one or more websites to be accessed in order to obtain the information requested by the user.

At a step 140, the concierge application 100 translates or converts the initial location of the end user device found in step 120 into the appropriate input parameter or location format for the website(s) identified in the step 130. The required location format will depend on the requirements of the website or sites identified in step 130 as appropriate for obtaining the information requested by the user. The input parameter or translated location can contain a variety of information, such as a street address, intersection, ZIP code, city and state, and the like.

In alternative embodiments, the concierge application 100 can convert a relatively precise coordinate location into a relatively imprecise website input, such as a name of the city and name of the state (which can be appropriate when knowing a precise location in a rural area). Conversely, when starting with a relatively imprecise location from step 120, the concierge application 100 can prompt the user to provide additional information in order to create a more precise website input, such as a street intersection or a ZIP+4 or ZIP+6 code.

In one example, the location coordinates for a mobile device may be converted to a nearby street address or corresponding ZIP+4 or ZIP+6 (DPC) code. In other cases, a precise street location may not be possible due to interference from surrounding buildings and other objects. The concierge application may be configured to determine an estimated error associated with the determined location information, and to decide based on this error whether or not the location is sufficiently precise to convert to a street address or intersection or to a ZIP+4 or ZIP+6 code. If the location is not precise enough for use as an input to an LBS website in order to find the closest merchant location, the system may ask the user for more precise location information, as noted above, such as a street name or the like.

For example, if an estimated error is of the order of less than fifty feet, the concierge application 100 determines that it is appropriate to convert the location to the nearest street address, and then uses that address as the input to the website store locator. If an estimated error is of the order of 100 feet, the concierge application 100 correlates the mobile device location to a ZIP+4 code, by choosing the ZIP+4 code that has its centroid closest to the coordinate location of the end user device. Alternatively, the detected location or street address may be converted to a DPC or ZIP+6 code for input to the website store locator. Conveniently, most company website store locators, such as the Domino's® website store locator, permit the use of a ZIP+4 or ZIP+6 code as an input to the Domino's® website store locator. In the case of an estimated error from MPC 60 of several hundred feet, the concierge application 100 can determine that it can only rely on the 5-digit ZIP code that has its centroid nearest to the mobile device location. Again, conveniently, the Domino's® website store locator permits a 5-digit ZIP code as an input, although in this case the store locator identifies nearby stores for carryout and not for delivery.

As is apparent from the foregoing discussion, a website application 40 such as a merchant's website locator can allow for a variety of different inputs, such as a street address, a ZIP+4 code, a ZIP+6 code which is equivalent to an address, and a 5-digit ZIP code. Another input accepted by the Domino's® and other merchant's locator websites is a name of the city and/or the name of the state.

In addition to the foregoing examples, there are many other types of inputs that can be determined from an end user device location, such as street intersections or landmarks (e.g., airports). In some cases a coordinate pair can be scaled for use as a direct input to an application or it can be converted into an index such as by interleaving the bits to form a quad-tree key, index or node, as disclosed in U.S. Pat. Nos. 5,901,214 and 6,282,540, the disclosures of which are hereby incorporated by reference.

In one embodiment, in step 140, the user location finder 524 first translates the latitude and longitude coordinates obtained for a mobile device 10 into the street address that is nearest to the user's location. Those skilled in the art can implement various algorithms for translating a coordinate location to a street address, intersection, ZIP+4 code, ZIP+6 code or the like. For example, an exemplary embodiment may use street segment information as found in the TIGER files available from the U.S. Census Bureau, and/or information that provides lat/long centroids of ZIP+4 and ZIP+6 codes such as is available from Tele Atlas, and/or data available from the U.S. Postal Service (USPS). An illustrative algorithm which can be implemented by the location finder 524 to determine a representative address from latitude/longitude coordinates of a user location uses the following steps:

1. Build an indexed ZIP+4 file using a quad-tree as the index, derived from the lat/longs associated with the centroid of each ZIP+4 for street, high-rise and firm ZIP+4s, but excluding ZIP+4 codes for PO Boxes, Rural Routes or general delivery ZIP+4s. One source for the ZIP+4 code and lat/long information to do this is the GDT (Tele Atlas) file.
2. Build a quad-tree key, index or node for the mobile device lat/long.
3. Using the mobile device quad-tree, retrieve all matching ZIP+4 codes from the indexed ZIP+4 file, and then calculate the closest ZIP+4 code to the lat/long of the mobile device. The number of digits used in the quad-tree for matching can vary as necessary to achieve the desired results.
4. Using the ZIP+4 code closest to the mobile device and the USPS ZIP+4 file, look up the address range, street name, street type, and street pre and post directions.
5. Build the street address for the midpoint of the address range obtained in step 4.
6. Using the 5-digit ZIP code portion of the ZIP+4 code, retrieve the preferred last line city and state name that is associated with the address from the USPS City State file.

The location of the end user wireless device 10 relative to the locations of information available from network LBS applications affects the ability of the LBS web application to provide relevant information. For example, if an individual is on a boat ten miles from shore, or hiking on a mountain or in the middle of a desert, there is no street or intersection nearby, nor are there any nearby businesses. In such a case, while it is possible to identify the nearest Starbucks®, there likely is little value if it is 100 miles away from the end user. Thus, as with most web applications, there tends to be an increase in value when used in urban over rural environments. Embodiments of the web concierge application 100 are configured to notify the user of the mobile device when there are no relevant merchant locations anywhere in the near vicinity of the user.

At step 150, the information retriever module 533 of the concierge application 100 queries the selected website(s) using the translated location from step 140 and, at a step 160, it receives the corresponding output data. While websites 40 are typically designed for human interaction, the concierge application 100 uses automated techniques commonly referred to as web bot technology to simulate the input normally obtained interactively from web users. TABLE 1 below provides an example of software source code to illustrate the usage of this type of technique for retrieving data from the store locator provided on the current Domino's® website.

TABLE 1

```
private string GetDoc( string URI, out string host )
{
    char[] body = new char[ 1024 ] ;
    StringBuilder strTotal = new StringBuilder( 8192 ) ;
    int count ;
    ASCIIEncoding ASCIIEncoder = new ASCIIEncoding( ) ;
    Encoding UTF8Encoder = System.Text.Encoding.GetEncoding("utf-8") ;
    host = "" ;
    HttpWebRequest webReq = (HttpWebRequest)WebRequest.Create( URI );
    HttpWebResponse response ;
    try
    {
        response = (HttpWebResponse)webReq.GetResponse( ) ;
        host = response.ResponseUri.Host ;
    }
    catch
    {
        return "" ;
    }
    // Pipes the stream to a higher level stream reader with the required encoding format.
    StreamReader s= new StreamReader( response.GetResponseStream( ), UTF8Encoder );
    // Now read response into a byte buffer.
    do
    {
        count = s.Read( body, 0, 1024 ) ;
            if( count > 0 )
            {
            strTotal.Append( body ) ;
            }
    } while( count != 0 ) ;
    response.Close( ) ;
    return strTotal.ToString( ) ;
```

TABLE 1-continued

```
    }
    string WebLocatorQuery( string address, string city, string state, string zip)
    {
        string URI ;
        string searchString = ">Store<" ;
        string hoursString = ">Hours<" ;
        string bodyBuffer ;
        string host ;
        string resultString = "" ;
        int searchStart = 0 ;
        int closeChevronIndex = 0 ;
        int openChevronIndex = 0 ;
        URI = String.Format(
"http://www.dominos.com/dominos_pizza/contact.nsf/USStoreLocator?openagent&street={0}&
cityStateZip={1}, {2} {3}", Address.Text, City.Text, State.Text, Zip.Text ) ;
        bodyBuffer = GetDoc( URI, out host ) ;
        // Address of store
        // Text we are parsing
        //   | Each store starts with this tag
        // v
        //   >Store</SPAN><BR t="t">12265 Scripps Poway Pkwy<BR t="t">Poway, CA 92064-
6147<BR t="t">Phone: 858-549-4343<
        //                ^                ^
        //         |      | skip two closing chevrons, address is up to next open chevron, then
        //     we skip close, take to open again for city, state and again for phone
        searchStart = bodyBuffer.IndexOf( searchString, searchStart ) + 1 ;
        closeChevronIndex = bodyBuffer.IndexOf( ">", searchStart ) + 1 ;
        closeChevronIndex = bodyBuffer.IndexOf( ">", closeChevronIndex ) + 1 ;
        openChevronIndex = bodyBuffer.IndexOf( "<", closeChevronIndex ) ;
        // Address
        resultString = "|" + bodyBuffer.Substring( closeChevronIndex, openChevronIndex –
closeChevronIndex ) + "|" ;
        // Check for a miss
    if( resultString == "|\r\n|" )
    {
        resultString = "|MISS|" ;
        return resultString ;
    }
    closeChevronIndex = bodyBuffer.IndexOf( ">", openChevronIndex ) + 1 ;
    openChevronIndex = bodyBuffer.IndexOf( "<", closeChevronIndex ) ;
    // City, State
    resultString += bodyBuffer.Substring( closeChevronIndex, openChevronIndex –
closeChevronIndex ) + "|" ;
    closeChevronIndex = bodyBuffer.IndexOf( ">", openChevronIndex ) + 1 ;
    openChevronIndex = bodyBuffer.IndexOf( "<", closeChevronIndex ) ;
    // Phone
    resultString += bodyBuffer.Substring( closeChevronIndex, openChevronIndex –
closeChevronIndex ) + "|" ;
    // The store hours are in the next column
    //   >Hours</SPAN><BR t="t">Su–Th 11AM–11PM, Fr–Sa 11AM–12AM<
    searchStart = bodyBuffer.IndexOf( hoursString, searchStart ) + 1 ;
    closeChevronIndex = bodyBuffer.IndexOf( ">", searchStart ) + 1 ;
    closeChevronIndex = bodyBuffer.IndexOf( ">", closeChevronIndex ) + 1 ;
    openChevronIndex = bodyBuffer.IndexOf( "<", closeChevronIndex ) ;
    resultString += bodyBuffer.Substring( closeChevronIndex, openChevronIndex –
closeChevronIndex ) + "|" ;
    return resultString ;
}
```

By using automated web bot techniques, the concierge application 100 can simultaneously query multiple websites to find the closest location of a requested merchant, and then parse the outputs to provide improved results. For example, if a user initiates a query for nearby pizza restaurants (using one of the methods described above), the concierge application 100 queries in parallel websites from Pizza Hut®, Domino's®, Papa John's®, California Pizza Kitchen®, and a wide variety of other known providers of pizza, in addition to other local search services such as those provided by Internet Yellow Pages® companies.

The web bot techniques also allow for the concierge application 100 to continuously monitor the correct response of the various websites that it accesses, so that if a company changes the interface or other parameters of its LBS website applications, the concierge application 100 can relatively quickly adapt to the changed conditions. This enables a type of a "heartbeat" updating feature without having processed a request from an end user, whereby the concierge application 100 determines that its interface with one or more websites either is working correctly, requires correction, or has been automatically corrected, and updates its data base and provides appropriate notifications if appropriate.

In some instances, the changes to a website cause an automatic update of the interface between the concierge and the website. Some changes to a website do not require any updating of the concierge application. For example, if the address of one of the stores listed in the Domino's® Pizza website was changed, then each time a user asks for that store, the new address is provided. Such changes to the contents of websites do not require modifications to the concierge application 100.

However, if a website is modified in such a way that, for example, the website no longer provides addresses for the associated stores, then each time the concierge application 100 queries the website for the address, it receives no data. The "heartbeat" updating feature enables the concierge application to determine that its interface with the website is working incorrectly. In such a case, the concierge application receives appropriate notifications that the concierge's interface with the website needs to be modified to, for example, warn the user that addresses of the stores are no longer available. If the URL for a website is changed, the new URL will be stored by the database manager 522.

Referring again to the step 160, the information retriever 533 of the concierge application 100 parses the data returned by a website 40 to obtain the desired information relevant to the particular LBS request from the step 120, such as store names, address, telephone numbers, hours open, directions, maps, and the like.

In some cases, as noted above, the concierge application 100 uses multiple disparate websites. In one example, a store is located from one website and precise directions from the mobile device location to the located store are obtained from another website. Thus, after obtaining a company location from a company-specific website such as Pizza Hut® or Domino's®, the concierge application 100 then obtains maps and/or driving directions from websites such as MapQuest® and/or MapPoint®. In some embodiments, the concierge application 100 also links to other spatial and non-spatial data sources. Exemplary data linkage techniques are disclosed in U.S. Pat. No. 5,901,214, mentioned above. In some cases, after identifying a restaurant or a doctor, the end user can also retrieve additional information, such as related customer ratings or health rating information.

At a step 170, the concierge application 100 provides the appropriate information back to the end user. In some cases it is necessary for the concierge application to make multiple queries in order to obtain the desired information. It may be desirable or necessary in some cases for the concierge application 100 to communicate preliminary information back to the end user, such as a list of nearby locations, and then obtain additional input from the user, such as a selection from the list.

Step 170 is performed after output module 530 finishes the web search for the information requested by the user and collects the requested information in output tables. In step 170, the processing module 520 processes the collected information and prepares an answer to the user. The processing is performed by translators 521, which parse and translate the information stored in the output tables into the format required by the user. The translated information is then sent to the user.

As noted above, the user device may be communicating with the concierge application 100 using a variety of technologies, including IVR, text messaging, GUI, Internet browser, and other known communication technologies. The answer to the user is sent by an appropriate interface module, depending on the technique originally used to contact the concierge application 100.

Where the user request was for the closest location of a merchant or driving directions to a merchant, the location information may be provided to the user with various degrees of geographic precision and may vary from low precision to fine precision. In some cases, low geographic precision of the desired merchant location is sufficient. For example, for a search which involves sparsely located specialty stores, a website application may provide information only at a "city level," i.e., it may only provide a name of the city compiled from Yellow Pages® data for identifying all entries of a type of business within a particular city. An example of a city level search is a search for specialty stores that are few and far between, such as a Maserati® dealer (or a Maserati® repair shop).

In other cases, relatively fine location precision is provided. For example, a relatively fine precision may be required to discriminate the closest Starbucks® location from among a large number of candidate locations, which in an urban environment can be within a small distance of each other.

In some cases the concierge application 100 needs to accommodate polygonal franchise boundaries, such as those used by Domino's® and Pizza Hut® franchises. In these cases, the closest location may be appropriate for carry-out but not be the appropriate location for delivery.

In still other cases there can be multiple considerations, such as ATMs located on multiple floors of a high rise building and/or located where access may be limited to certain hours. Similarly, a FedEx® drop box location may be limited to certain types of packages and/or it may be self-service or full-service.

As noted above, the output to the user device at step 170 will use the same interface that was used to make the original request, such as text messages, graphical user interface, Internet browser, or voice output via the IVR interface. In the latter case, the concierge application 100 can interact with IVR technology to receive spoken requests from and to speak results back to a telephony end user. The concierge application 100 can be implemented in various ways to allow for voice input and output, such as on the IVR platform or on a separate platform that communicates with the IVR platform. In all cases it is a matter of human interface design to reformat and wrap the website output from the step 160 as appropriate for providing the user output at step 170, e.g., building the appropriate dialogue and, in the case of the IVR, using text-to-speech or recorded voice for spoken output.

One option which may be provided in the concierge application is communication via a live operator, as noted above. This may be provided by specific user request or where other types of communication have failed to convey the information required. Where the user communicates a request to a live operator, the operator obtains desired results from the website(s) as appropriate for a caller's LBS request, and then speaks back information to the caller and/or causes information to be transmitted (e.g., display information sent back to a device) and/or provides some other service, such as enabling the caller to be connected to a located store's telephone number. Thus, in some embodiments, an operator utilizes a decision-making process. For example, if the caller requests information about a particular merchant or type of product or service, the operator has to decide which websites to query, such as an Internet Yellow Pages® site, Google®, Netscape®, Yahoo®, or other. In some cases the operator's task is effectively mechanical. For example, if the caller requests identification of the nearest location for a specific merchant or company, the operator mechanically facilitates queries to those company websites and facilitates the communication of the requested information back to the caller.

One example of a specific user LBS request will now be described in detail. A user of communication device 10 may request the location of the closest outlet or store of a business, such as a restaurant, pizza delivery store such as Domino's® or Pizza Hut®, for example, Starbucks®, FedEx® office, UPS® office, ATM, bank, or the like. For the purpose of the following example, the user requests the location of the closest ABC pizza delivery store, where ABC could be any pizza delivery store or franchise such as Domino's®, Pizza Hut®, or others. It will be understood that the same basic method can be used regardless of the type of business or merchant location which the user is seeking, whether it is a restaurant, coffee shop, bank, postal delivery service, car repair shop or any other type of merchant. Also, the user need not necessarily request the business or merchant by name, and could be simply looking for the closest garage, ATM, pizza delivery store, or the like, regardless of the company name, which can be found using a generic Yellow Pages® website, or other search engine, for example.

On receipt of a concierge request, the concierge application 100 first determines the location of the user using any of the techniques discussed above. The application then identifies the website or websites needed for locating the closed ABC pizza delivery store, for example the ABC website and possibly also a driving directions website where the user has requested such directions. The coordinate location of the end user device 10 is then translated into a street address that is nearest to the user's location, or into another location format if required by the ABC website. The application then launches the website of the requested merchant, such as ABC pizza delivery store, and queries the website with the user's street address, ZIP+4 or ZIP+6 to receive back information about the closest ABC pizza delivery store. In addition to identifying the address of the particular store, the company website can also provide the store's telephone number and hours of operation, as well as information about other nearby ABC pizza delivery locations that are available for carryout service. Concierge application 100 receives this information as output by the web application 40, and then selects and reformats information for communication back to the end user device 10. The reformatting can be done in a variety of ways.

The format of the answer provided to the user depends on the way the user contacted the concierge application 100. For example, if the user contacted the concierge application 100 over the phone, the concierge application 100 can provide to the user the phone number of the nearby ABC pizza delivery franchise and/or can offer to connect the user with the franchise. For example, the user can be automatically connected with the franchise and can place the pizza order right away over the phone. Alternatively, the user can be connected to a navigation-type system, which can provide the user with step-by-step directions to the nearby franchise. In one embodiment, the wireless infrastructure 20 provides access to the applications 40 via a telephone network. In this embodiment, the concierge application 100 connects the wireless device 10 with the selected LBS application 40. To connect with the LBS application, the concierge application 100 can use technology similar to the technology implemented in an "automated phone assistance," such as, e.g., "411" service. For example, once the concierge application 100 identifies a phone number of the requested LBS application, it can automatically connect the wireless device 10 with the phone number of the LBS application, in the same way that the "411" service can automatically connect a customer with the phone number of the requested party.

The communication may be facilitated by a telephone connection, where a user of the wireless device 10 dials a dedicated phone number (e.g. 1-800x, 1-877x, etc.) provided and serviced by the wireless infrastructure 20. If the user interacts with the concierge application via a voice connection, the IVR interface 511 collects the voice input information from the user, translates communications between the concierge 100 and the wireless device 10, plays additional questions to narrow down the search for the answer to the user question, accepts user audio answers, and the like. The concierge application 100 accesses different telephone numbers associated with different LBS or groups of LBS with associated scripts stored by the data base manager and implemented by the IVR to obtain the information required by the caller. The concierge can then provide the information to the IVR interface 511 which translates and speaks the information to the caller.

If the user contacted the concierge application 100 using a graphical user interface ("GUI") application, the concierge application can display the response to the user on the display window of the wireless device 10. The concierge may display the phone number to the closest ABC pizza company franchise, take the order from the user by communicating with the user on the graphical user interface displayed on the wireless device 10, or provide the user with step-by-step directions to the nearby ABC company franchise, such as a Domino's® pizza delivery franchise, for example. After output module 530 finishes the web search of the information and collects the requested information in the output tables, the processing module 520 processes the information and prepares an answer to the user. The processing is performed by translators 521, which parse and translate the information stored in the output tables.

If the user contacted the concierge application 100 by launching a browser, the browser can display the response to the user on the display window of the wireless device by communicating with the browser. For example, the concierge may display the phone number to the closest ABC company franchise in the browser window, take the order from the user by communicating via the browser, or display in the browser step-by-step directions to the nearby ABC company franchise.

If the ABC pizza delivery store is to be instructed to deliver pizza to the current location of mobile device 10, a coordinate location for the user must be determined with sufficient precision to translate the coordinates accurately to a nearby street address. However, this may not be possible in all cases, for example if the results obtained using triangulation methods are imprecise due to the possible signal interference from the surrounding buildings and other objects. Thus, in exemplary embodiments, the concierge application 100 also determines an estimated error introduced by such devices as MPC 60 or other location finding techniques, and provides appropriate information to the user based on the estimated error, as discussed in more detail below.

LBS websites 40 can return different types of output information depending on the type of the input parameter. For example, with a relatively precise location input (e.g., street address, ZIP+4 or ZIP+6 code), the Domino's® website returns information about both a delivery location and carryout locations, but with a relatively imprecise location input (e.g., 5-digit ZIP code or city and state) it returns information only for carryout. Because the concierge application 100 controls the input type, it facilitates the ability to parse the output returned from a website. Concierge application 100 may be configured to translate the location available from the wireless infrastructure 20 into the most precise format compatible with the websites 40, as justified by the precision of the location.

Figure 4:
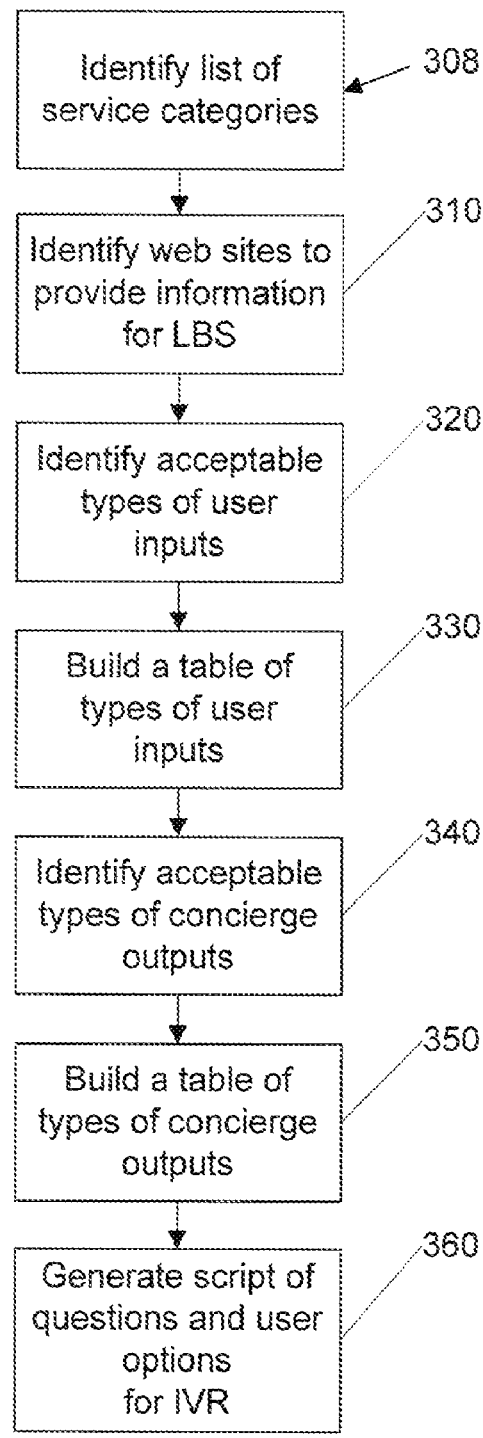
FIG. 4 is a flowchart illustrating a method of initially setting up the concierge application according to an embodiment.

FIG. 4 is a flow chart illustrating the initial set up of the system to identify websites having LBS applications for use in the concierge application and to associate or link identified websites with a list of LBS service categories, and for building associated tables or scripts for user inputs and concierge outputs, using the web page setup module 525 of FIG. 2. The same procedure is used both in initial set up of the concierge application and also when new websites are added to the list of stored URLs and associated service categories, or when websites are updated. There are a variety of reasons to expand the list of the LBS websites. For example, the list of LBS websites may be expanded because the concierge application 100 was unable to find an answer to a user question, or because list of service categories, list of associated websites, input tables, or output tables are outdated. The tables or scripts will be based on different user requests as well as possible responses received from the website or sites. The websites, user input script, and concierge output script may be added and updated as needed either automatically or manually by a system operator executing the steps in FIG. 4.

The identified websites and associated service categories will be stored in data base module 525 along with the associated scripts or tables of user inputs and concierge outputs. It will be understood that the scripts may be in the form of trees with different branches based on different responses received from the user or from an LBS website.

In the first step 308, a list of service categories is identified and stored. These categories may include a list of specific merchants, such as restaurants, stores, theaters, subway stations, post offices, car repair shops, banks, or the like, general merchant categories, driving directions from one location to another, making reservations for hotels, theaters, airlines, trains, ferries, and the like, as well as other services suitable for a concierge application. In step 310, websites which can provide requested information are identified and the URL of each website is linked with at least one appropriate entry on the stored list of categories. In some cases, a URL will be linked with more than one entry on the category list, and each category may be linked to one or more URLs, as appropriate. The URL may be a home page for the website, or a URL directly linked to the LBS application at the website.

In step 320, acceptable user inputs are identified and a table or script of the acceptable user inputs is built and stored (step 330). The table or script may include acceptable types of requests that the user can submit to the concierge application based on the type of service required, and the type of information required to query network resources in order to find an answer to the user request. One example would be a user request for the closest Domino's Pizza® restaurant. In one embodiment, the acceptable types of user input for such a request include the name of the restaurant, user location (such as longitude and latitude coordinates of user location provided by a MPC, street address, ZIP+4 or ZIP+6 code), and the like. If the user wants to send a package, the acceptable types of user input may include the name of a carrier, the type of service sought, such as a self-service FedEx drop box or a full-service FedEx office location, and the like.

At a step 330, a table (or an array, script, list of pointers, or the like) of acceptable types of user inputs is built. At this step, the initialization subroutine organizes the previously determined acceptable types of user inputs into a table or script that can be easily accessed by the concierge during answering of user requests. The organization of the table depends on the software configuration used in the implementation of the concierge application.

At a step 340, the website set up module determines a list of acceptable types of concierge outputs. The list contains entries that define types of possible answers that the concierge application can provide to the user in response to the user request. For example, if a user asked for a location of the Domino's® Pizza restaurant, the possible types of responses from the concierge application may include an address of the restaurant, a ZIP+6 location code of the restaurant, a phone number to the restaurant, information that no restaurant in the area has been found, a prompt to provide some additional information, a list of similar restaurants in the area, and the like.

At a step 350, an output table or script containing acceptable outputs from the concierge application is built. At this step, the previously identified outputs are organized into a table that can be easily accessed and filled with information by the concierge application when processing a user request. As with the user input tables, the organization and the format of the output table depends on the software configuration used in the implementation of the concierge application.

At a step 360, a sequence of questions is generated in the form of a script for the concierge application. The script is a sequence of questions that the concierge application needs to ask the user before the concierge can start a search, and different scripts may be provided for different service requests. A set of user options will be associated with each question, and subsequent questions may depend on the option selected. The questions and user options are stored in the data storage module for use when the user interface format is text messaging, a graphical interface, or an Internet browser, and may also be pre-recorded and ported to an IVR system for use when spoken requests and spoken answers are used in communicating with the user.

In one embodiment, the questions and user options generated are organized in a form of a hierarchical tree. The tree comprises ordered sequences of questions used to collect information necessary to answer the user question. The questions are ordered in such a way that at each step of the sequence, the user has one or more options to select and at each step the concierge refines the search parameters. For example, to narrow down the search, the concierge might first ask the user whether the request pertains to finding a restaurant, and if so, whether the request pertains to delivery of pizza or other type of food. Then, if the request pertains to the delivery of pizza, the concierge might ask whether the request pertains to the delivery of pizza from Domino's® Pizza, Pizza Hut®, or other establishment.

Figure 5:
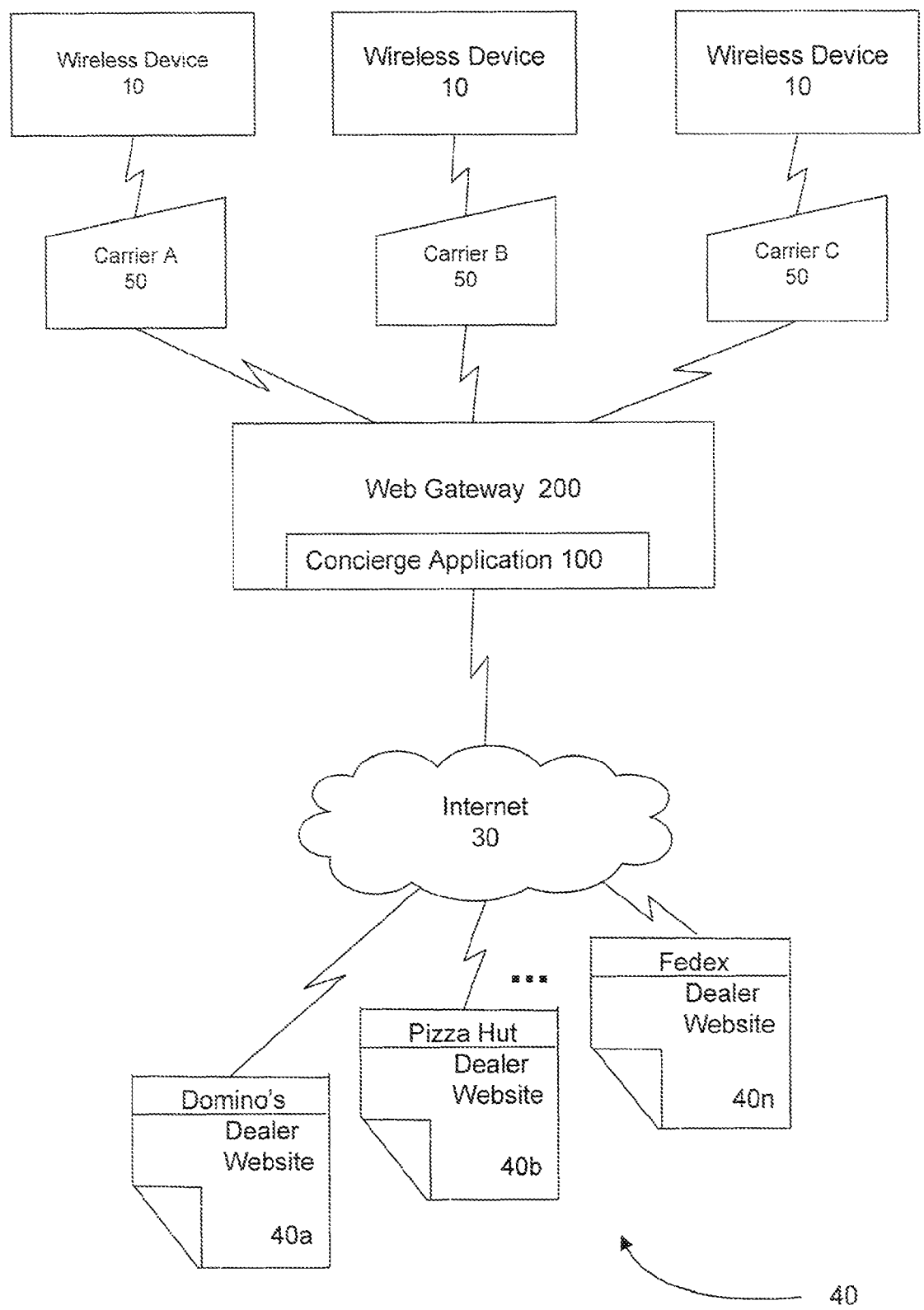
FIG. 5 is a block diagram illustrating multiple wireless devices connected to multiple carriers in a concierge method and system according to another embodiment.

FIG. 5 is a block diagram illustrating multiple wireless devices 10 connected to multiple carriers 50. In one embodiment, the concierge application 100 is implemented using a web gateway 200. While the embodiment of FIG. 1 illustrates the concierge application 100 associated with carrier infrastructure 20 supporting a single carrier 50, the embodiment of FIG. 5 illustrates the concierge application 100 interfacing with multiple carriers 50 through web gateway 200. The carriers 50 in turn interface with multiple wireless devices 10. The concierge application 100 of FIG. 5 may be identical to the application as illustrated in FIG. 2, and the method of obtaining information and providing it to requesters using wireless devices 10 will be the same as described above in connection with FIGS. 1 to 4.

The carriers 50 interface with web gateway 200 over network connections. The network connections can be connections within the infrastructure of the wireless networks, or they can be one or more of a variety of communications links such as the public Internet or dedicated T1, T3, frame relay links, etc. Concierge application 100 within gateway 200 communicates with websites 40 via the Internet 30 in the same manner as shown and discussed for FIGS. 1 to 3.

By providing a gateway for multiple carriers 50, the embodiment of FIG. 5 facilitates an implementation of the concierge application 100 in a service provider model. Although not shown in FIG. 5, the web gateway 200 interfaces with IVR platforms and operators in the same manner as shown and discussed above for the embodiments of FIGS. 1 to 4, or an IVR or operator platform can include the web gateway 200. In either of the above embodiments, the concierge application 100 can handle multiple requests from different users (or the same user) in the same way that the method and system of the first embodiment handled multiple requests from users using the same carrier. For example, the concierge application receives a first LBS request and identifies a first network application for that request, and receives a second LBS request for which a second network application is identified. The location of the LBS requested may be in different formats for the different network applications. For example, the first network application could be a web store and the input parameter to that application could be a ZIP+4 or ZIP+6 code. The second network application could be an LBS website and the input parameter to that application could be a street address identified for the LBS requester.

In the embodiment of FIG. 5, the location of a user device 10 can be obtained in various ways, as in the first embodiment, and may involve first determining the carrier network 50 over which the user is communicating, then querying an MPC of that carrier network to determine the current location of the wireless device. In this case, the location may be found using the method described in U.S. Patent Application Publication No. 20060106930 (co-pending application Ser. No. 11/281,952 filed Nov. 15, 2005) as referenced above. Alternative location finding techniques may also be used, as discussed in detail above in connection with FIGS. 1 to 4.

Implementations of the concierge application 100 can provide various benefits, such as the advantages of accessing specific company websites in lieu of Yellow Pages® data. There are various issues with Yellow Pages® data including: (1) there are many permutations for the same business name; (2) inconsistent categories across directories published in different parts of the country; (3) lack of currency (e.g. a business could buy a 3 year Yellow Pages® ad and go out of business after the first year), etc. In addition, many entries in the Yellow Pages® do not have addresses, and there are many entities that do not appear in the Yellow Pages®—entities such as ATMs, drop boxes and other self serve locations are not advertised in the Yellow Pages® as they have no phone number to call. Most of these systems were based on an advertising business model, so they often were not designed to provide the consumer with what they really needed. A specific business website typically does not have these Yellow Pages® quality issues.

Aspects of embodiments also provide improvements over going directly to some dealer locator websites. For example many sites only provide ZIP code entry. Since ZIP codes usually cover a fairly large area, these sites cannot provide precise driving directions. However, since embodiments determine both the precise location of the end user device and the precise location of the desired business, precise driving directions can now be determined and returned to the end user. Concierge embodiments using inventive aspects disclosed herein can advantageously provide access to data that is both locational and current, such as the identity and times of movies currently showing at a nearby movie theatre.

Finally, as mentioned above, methods implementing aspects of the inventions can address privacy concerns. There is no need to pass an end user identity to a commercial service provider outside of a regulated network, rather, the commercial services receive only the LBS request and some form of locational input. Furthermore, if, for example, privacy-related rules or regulations preclude transmitting a latitude and longitude of a cell phone outside the cell phone network, an application can still provide a location-based service from outside the network by using a translated form of the device location such as ZIP+4 or ZIP+6 code. In other words, translation of the coordinate location inside the wireless network can permit use of the translated location outside the wireless network—the caller's telephone number can be kept inside the network.

Those of skill will further appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the inventions. In addition, the grouping of functions within a module, block or step is for ease of description. Specific functions or steps can be moved from one module, block or step without departing from the inventions.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the inventions. Various modifications to these embodiments will be readily apparent to those skilled in the art, and the generic principles defined herein can be applied to other embodiments without departing from the spirit or scope of the inventions. Thus, the inventions are not intended to be limited to the embodiments shown herein but are to be accorded the widest scope consistent with the principles and novel features disclosed herein.

The invention claimed is:

1. A method of providing a location-based service utilizing a concierge application on a first server which allows a communication device to receive the location-based service from a network application, the method comprising:

receiving, at a first server having a concierge application, a location-based service request from a communication device via a connection to an Interactive Voice Response ("IVR") module;

obtaining a geographic coordinate location of the communication device;

identifying a network application to provide the requested location-based service, the network application residing on a second server and selected from a plurality of network applications, wherein the network application includes a web interface requiring a location input which is less precise than the coordinate location;

translating, at the concierge application, the coordinate location of the communication device into the less precise location input required by the web interface of the network application;

automatically providing, by the concierge application, the less precise location input to the network application via the web interface on the second server;

receiving, at the concierge application, an output from the network application; and providing a location-based service from the concierge application to the communication device based on the output.

2. The method of claim 1, wherein the communication device is a mobile device.

3. The method of claim 2, wherein the coordinate location is a latitude and longitude pair.

4. The method of claim 2, wherein obtaining the coordinate location comprises obtaining multiple coordinate locations of the mobile device over time.

5. The method of claim 4, wherein translating the coordinate location into the less precise location input comprises translating multiple coordinate locations into multiple less precise location inputs.

6. The method of claim 4, wherein translating the coordinate location into the less precise location input comprises translating multiple coordinate locations into the less precise input.

7. The method of claim 1, wherein obtaining the coordinate location comprises obtaining the coordinate location from the communication device.

8. The method of claim 2, wherein obtaining the coordinate location comprises obtaining the coordinate location from a system external to the mobile device that determines the mobile device location.

9. The method of claim 2, further comprising obtaining an indication of the precision of the coordinate location of the mobile device.

10. The method of claim 1, wherein receiving a location-based service request comprises receiving spoken information.

11. The method of claim 1, wherein the first server is part of a wireless infrastructure.

12. The method of claim 1, wherein receiving a location-based service request comprises receiving a request derived from key entered data.

13. The method of claim 1, wherein receiving a location-based service request comprises receiving a request derived from input through a graphical user interface ("GUI").

14. The method of claim 1, wherein receiving a location-based service request comprises receiving a request over a wireless voice network.

15. The method of claim 1, wherein receiving a location-based service request comprises receiving a request over a wireless data network.

16. The method of claim 1, wherein the communication device is a wireless device and receiving a location-based service request comprises receiving a text message from the wireless device.

17. The method of claim 1, wherein the network application is a website.

18. The method of claim 1, wherein the network application is a company-specific website location-based service ("LBS") application selected from multiple candidate company-specific website LBS applications.

19. The method of claim 1, wherein the network application is a web location-based service ("LBS") application that provides information for multiple independent companies.

20. The method of claim 1, wherein identifying a network application comprises prompting the communication device user to select an entity associated with a network application from multiple candidate entities.

21. The method of claim 1, wherein identifying a network application comprises selecting an entity associated with a network application from multiple candidate entities based on speech input received from the communication device user.

22. The method of claim 1, wherein identifying a network application comprises selecting a network application that provides information about multiple companies that provide a similar service.

23. The method of claim 1, wherein identifying a network application comprises selecting multiple network applications to obtain information about multiple companies that provide a similar service.

24. The method of claim 1, wherein identifying a network application comprises selecting an entity associated with a network application from multiple candidate entities based on a text message received from the communication device.

25. The method of claim 1, wherein the less precise location input is a street address.

26. The method of claim 1, wherein the less precise location input is a postal code.

27. The method of claim 26, wherein the postal code is a United States Postal Service ("USPS") zone improvement plan ("ZIP") code.

28. The method of claim 27, wherein the postal code is a ZIP+4 code.

29. The method of claim 27, wherein the postal code is a ZIP+6 code.

30. The method of claim 1, wherein the less precise location input is an identification of a city.

31. The method of claim 1, wherein a first network application is identified based on a first location-based service request and a second network application is identified based on a second location-based service request, and the less precise location input to the first network application is in a format different from the less precise location input to the second network application.

32. The method of claim 31, wherein the first network application is a web store locator, the input to the first network application is a postal code, the second network application is a web location based service ("LBS") application that provides directions, and the input to the second network application is a street address.

33. The method of claim 2, wherein receiving an output from the network application comprises receiving information about at least one location in the vicinity of the mobile device.

34. The method of claim 2, wherein receiving an output from the network application comprises receiving information about a plurality of locations in the vicinity of the mobile device.

35. The method of claim 2, wherein receiving an output from the network application comprises receiving directions from the communication device location to at least one location in the vicinity of the mobile device.

36. The method of claim 2, wherein providing a location-based service to the mobile device comprises providing output to the mobile device user through a GUI.

37. The method of claim 1, wherein providing a location-based service to the mobile device comprises providing spoken output to the communication device user.

38. The method of claim 2, wherein providing a location-based service to the mobile device comprises providing a text message output to the mobile device user.

39. The method of claim 2, wherein providing a location-based service to the mobile device comprises providing information about a location near to the mobile device.

40. The method of claim 2, wherein providing a location-based service to the mobile device comprises providing information about multiple locations near to the mobile device.

41. The method of claim 1, wherein providing a location-based service to the communication device comprises providing directions from the mobile device location to at least one location near to the communication device.

42. The method of claim 1, wherein providing a location-based service to the communication device comprises establishing a communication session between the communication device and a particular location identified by the network application.

43. The method of claim 2, wherein providing a location-based service to the mobile device comprises establishing a voice communication link between the mobile device and a particular location identified by the network application.

44. The method of claim 1, wherein providing a location-based service to the communication device comprises enabling the communication device to place an order for a product or service from a particular location identified by the network application.

45. The method of claim 1, further comprising obtaining an estimated error associated with the coordinate location.

46. The method of claim 45, wherein the translating the coordinate location of the mobile device into a less precise location input comprises determining the less precise location input based on the estimated error associated with the coordinate location.

47. The method of claim 1, further comprising enabling a live operator to communicate with the communication device user prior to identifying the network application related to the service request.

48. The method of claim 47, wherein identifying a network application comprises obtaining information from a live operator that has communicated with the communication device user.

49. The method as claimed in claim 1, wherein the step of providing a location-based service to the communication device comprises translating the output from the network application into a location output in a format compatible with the communication device and transmitting the location output to the communication device.

50. A method of providing location-based services using a plurality of network applications, comprising:
a concierge application on a first server receiving a first location-based service request from a first mobile device via a connection to an Interactive Voice Response ("IVR") module;
obtaining a first geographic coordinate location of the first mobile device;
the concierge application identifying a first network application to provide the requested first location-based service, the network application residing on a second server and selected from a plurality of network applications, wherein the first network application includes a web interface;
the concierge application providing a locational input to the first network application via the web interface based on the first coordinate location and the input requirements of the first network application, wherein the input requirements include a mailing address or zip code;
the concierge application receiving an output from the first network application;
the concierge application providing a location-based service ("LBS") to the first mobile device based on the output;
the concierge application receiving a second location-based service request, at the concierge application on the first server, from a second mobile device;
obtaining a second geographic coordinate location of the second mobile device;
the concierge application identifying a second network application to provide the requested second location-based service, the network application residing on a third server and selected from a plurality of network applications, wherein the second network application includes a web interface;
the concierge application providing a locational input to the second network application via the web interface based on the second coordinate location and the input requirements of the second network application, wherein the input requirements include a mailing address or zip code;
the concierge application receiving an output from the second network application;
the concierge application providing a location-based service ("LBS") to the second mobile device based on the output;
the concierge application monitoring responses received from the first network application of the second server and the second network application of the third server;
the concierge application identifying a change to the web interface of the first network application or the second network application based on the responses received from the first network application or the second network application;
the concierge application determining whether an interface between the concierge application and the changed web interface can be automatically updated to adapt to the changed web interface; and
the concierge application automatically updating the interface between the concierge application and the changed web interface to adapt to the changed web interface if it is determined that the interface between the concierge application and the changed web interface can be automatically updated.

51. The method of claim 50, wherein receiving a first location-based service request comprises receiving a request derived from spoken information.

52. The method of claim 50, wherein identifying a first network application comprises selecting a website associated with a web locator application from multiple candidate websites based on input received from the mobile device.

53. The method of claim 50, wherein providing a locational input to the first network application comprises providing a latitude and longitude pair as an input to the first network application.

54. The method of claim 50, wherein providing a locational to the first network application comprises providing a parameter translated from the first coordinate location as an input to the network application.

55. The method of claim 50, wherein the input to the first network application is in a format different from the input to the second network application.

56. The method of claim 55, wherein the first network application is a web store locator, the input to the first network application is a postal code, the second network application is a web LBS that provides directions, and the input to the second network application is a street intersection.

57. The method of claim 50, wherein the first server is part of the wireless infrastructure.

58. The method of claim 50, wherein providing a location-based service to the second mobile device comprises providing directions from the second mobile device location to a nearby location.

59. The method of claim 50, wherein providing a locational input to the first network application comprises translating the first coordinate location into a format compatible with the first network application and providing the translated location to the first network application, and the step of providing an LBS to the first mobile device comprises translating the output from the network application into a format compatible with the first mobile device and providing the translated output to the first mobile device.

60. A method of providing a location-based service comprising:
  receiving, at a concierge application on a first server, a request for location-based information from a mobile device via a connection to an Interactive Voice Response ("IVR") module;
  identifying a specific location-based web application to provide the requested location-based service, the web application residing on a second server and selected from a plurality of web applications;
  obtaining a latitude and longitude pair of the current location of the mobile device;
  translating, at the concierge application on the first server, the latitude and longitude pair to a location identifier for use as an input parameter as required by the web application, wherein the location identifier is less precise than the latitude and longitude pair and is a most precise format compatible with the web application;
  the concierge application providing the location identifier to the web application;
  the concierge application receiving an output from the web application; and
  the concierge application providing information to the mobile device based on the output received from the web application.

61. The method of claim 60, wherein providing a location-based service to the mobile device is selected from the group consisting of: identification of a closest location from multiple candidate locations; directions from the mobile device location to a nearby location; enabling an order of a product or service from a nearby location; and establishing a communication session between the mobile device and a nearby location.

62. A method of providing a location-based service comprising:
  receiving, at a first server, a location-based service request initiated by a network communication device via a connection to an Interactive Voice Response ("IVR") module;
  identifying a plurality of network location-based service applications to provide the requested location-based services, the network applications residing on separate servers, wherein the location-based service applications are web applications;
  receiving a locational input parameter translated from a coordinate location of the communication device, wherein the locational input parameter is less precise than the coordinate location;
  providing, from the first server, the locational input parameter to two or more of the network applications;
  receiving, at the first server, an output from one or more of the network applications; and
  providing, from the first server, selected information from the output from each of the two or more network applications for use in providing a location-based service to the communication device.

63. A method of providing a location-based service comprising:
  receiving, at a first server, an input parameter representing a geographic location associated with a user communicating over a network;
  receiving, at the first server, a location-based service ("LBS") request initiated by the user via a connection to an Interactive Voice Response ("IVR") module;
  selecting a web LBS application to provide the requested location-based service, the web LBS application residing on a second server and selected from multiple candidate web LBS applications;
  translating, at the first server, the input parameter into a format as required by the selected web LBS application, wherein the translated input parameter is a mailing address or zip code;
  providing, by the first server, the translated input parameter to the selected web LBS application;
  receiving, at the first server, an output from the web LBS application;
  the first server providing selected information from the output for use in providing a location-based service to the user;
  monitoring, by the first server, responses received from the web LBS application;
  identifying, by the first server, a change to the web LBS application based on the responses received from the first network application and the second network application;
  determining, by the first server, whether an interface between the server and the LBS application can be automatically updated to adapt to the change to the web LBS application; and
  updating, by the first server, the interface to adapt to the change if the concierge application can be automatically updated to adapt to the change.

64. The method of claim 63, wherein the server is part of a wireless infrastructure.

65. The method of claim 63, wherein all steps are performed without interaction with a live operator.

66. A location-based concierge system, comprising a first server, the first server comprising:
- an interface module configured to receive a location-based service request from a communication device via a connection to an Interactive Voice Response ("IVR") module;
- a processor module configured to find the geographic location of the communication device,
- a network application identification module configured to identify a network application to provide the requested location-based service, the network application residing on a second server and selected from a plurality of network applications, wherein the network application includes a web interface;
- a translator module configured to translate the location of the communication device into a locational input parameter as required by the network application, wherein the locational input parameter is a mailing address or zip code;
- an output module configured to provide the locational input parameter to the network application via the web interface, to receive a location output from the network application in response to the locational input parameter, and to provide the location output to the interface module, wherein the output module is further configured to monitor responses received from the web application, to identify changes to the web application based on the responses received from the web application, to determine whether the output module can be automatically updated to adapt to the changes to the web application, and to update the output module to adapt to the changes to the web application if the output module can be automatically updated to adapt to the change in the web application; and
- the interface module being configured to provide the location output to the communication device in answer to the location-based service request.

67. The system as claimed in claim 66, further comprising a data base module for storing a list of service categories and a website list of LBS websites providing location-based services ("LBS"), and for linking each service category with at least one website from the list.

68. The system as claimed in claim 67, further comprising a website set up module configured to add LBS website pages to the website list and to update existing website page information on the list with updated information.

69. The system as claimed in claim 66, wherein the translator module is further configured to translate incoming location-based service requests to a format compatible with the processor module and to translate location outputs into a format compatible with the format of the service request from the communication device before providing the location output to the communication device.

* * * * *